Patented Aug. 14, 1945

2,382,100

UNITED STATES PATENT OFFICE 2,382,100

HYDROCARBON CONVERSION PROCESS

Robert F. Ruthruff, Chicago, Ill.

No Drawing. Application November 27, 1944,
Serial No. 565,422

20 Claims. (Cl. 260—683.4)

This invention relates to a process for the alkylation of saturated organic compounds with olefines and to improved catalysts for accelerating said reaction. Additionally, this invention relates to a process for the isomerization of saturated organic compounds and the alkylation of the resulting isomerized organic compounds with olefines and to improved catalysts for accelerating said reactions. In one specific embodiment thereof, this invention relates to a process for the alkylation of isoparaffins with olefines and to improved catalysts for accelerating said reaction. In another specific embodiment thereof, this invention relates to the isomerization of normal paraffins to isoparaffins and the alkylation of the resulting isoparaffins with olefines and to improved catalysts for accelerating said reactions.

This application is in part a continuation of my copending application, Serial Number 427,171, filed January 17, 1942, which in turn is in part a continuation of application, Serial Number 296,807, filed September 27, 1939, now U. S. Patent 2,271,956, issued February 3, 1942.

It is an object of this invention to provide an improved process for the alkylation of saturated organic compounds with olefines and to provide improved catalysts for accelerating said reaction.

Additionally, it is an object of this invention to provide an improved process for the isomerization of saturated organic compounds and the alkylation of the resulting isomerized organic compounds with olefines and to provide improved catalysts for accelerating said reactions.

It is a further object of this invention to provide an improved process for the alkylation of isoparaffins with olefines and to provide improved catalysts for accelerating said reaction.

It is another object of this invention to provide an improved process for the isomerization of normal paraffins to isoparaffins and the alkylation of the resulting isoparaffins with olefines and to improved catalysts for accelerating said reactions.

It is well known in the art to alkylate saturated organic compounds with olefines. For example, it is well known in the art to alkylate isoparaffins with olefines. As a specific example of such a reaction, the alkylation of isobutane with olefines containing four carbon atoms to the molecule may be cited. Numerous catalysts have been proposed for this reaction. Among these may be mentioned concentrated sulfuric acid, both alone and sulfuric acid promoted with boron fluoride or metal salts, such as salts of mercury, nickel, silver, copper and the like; concentrated phosphoric acid promoted as above or not as desired; mixtures of concentrated sulfuric acid and concentrated phosphoric acid promoted as above or not as desired; aluminum halides, especially aluminum chloride and aluminum bromide, promoted if desired by a trace of water, hydrogen halide, alkyl halide or the like; anhydrous hydrogen fluoride; boron fluoride, promoted if desired with a trace of water, hydrogen fluoride, nickel or mixtures of said promoters and similar catalysts. All catalysts proposed to date have various disadvantages. The mineral acids, for example, bring about secondary reactions to a considerable extent. This not only destroys an appreciable amount of the charge but more serious, contaminates and ruins the activity of the catalyst thus requiring frequent regeneration thereof which is difficult, tedious, wasteful and expensive. Aluminum chloride is not soluble to any extent in the reactants and hence is not very active. Since only the surfaces of the catalyst particles are effective, the catalyst is not efficiently used. Additionally, this halide brings about secondary reactions wasteful of reactants and destructive of catalyst. Aluminum bromide is very expensive and also brings about secondary reactions. Boron fluoride is very expensive.

Also, it is well known in the art to isomerize saturated organic compounds. For example, it is well known in the art to isomerize normal paraffins containing four or more carbon atoms to isoparaffins. As a specific example of such a reaction, the isomerization of normal butane to isobutane may be cited. Several catalysts have been proposed for accelerating this reaction, most of these being an aluminum halide, especially aluminum chloride or aluminum bromide, either alone or supported on or united with another material. Such catalysts are usually promoted with a trace of water, hydrogen halide or the like. These catalysts have various disadvantages. Aluminum chloride is not soluble to any extent in the reactant and hence is not very active. Since only the surfaces of the catalyst particles are effective, the catalyst is not efficiently used. Additionally, this halide brings about secondary reactions wasteful of reactants and destructive of catalyst. Aluminum bromide is very expensive and also brings about secondary reactions.

I have found that alkyl aluminum halides are cheap and effective catalysts for promoting the alkylation and isomerization reactions above described and others of a similar nature. Alkyl aluminum halides are effective in promoting the alkylation of saturated organic compounds with olefines. Alkyl aluminum halides are effective in promoting the isomerization of normal paraffins containing four or more carbon atoms to isoparaffins. Alkyl aluminum halides are soluble in most organic liquids.

Additionally, when using prior art catalysts, the alkylation of isobutane with propylene and more especially with ethylene has been found to proceed extremely slowly. When employing alkyl aluminum halides however, these lower olefines react rapidly. This is highly advantageous since in prior art processes, which are essentially limited to the alkylation of isobutane with olefines containing four carbon atoms, isooctanes are formed. While these are valuable components in aviation blends, the volatility is low. For use in aviation gasoline, isooctanes must be blended with other materials of higher volatility. Highly volatile materials possessing at the same time the requisite high octane number are available only in limited amounts. However, by the alkylation of isobutane with, for example, ethylene, using the catalysts of the instant invention, branched chain hexanes are formed. These have a high octane number and high volatility and are excellently suited for blending with isooctane. The same applies to the branched chain heptanes resulting from the alkylation of isobutane with propylene, using the catalysts of the instant invention.

Alkyl aluminum halides are conveniently prepared. The most general method of preparation involves the interaction of metallic aluminum and an alkyl halide as described by Grignard and Jenkins (Bull., IV, 37, 1376, 1925) and Leone (Gazz. chim. ital., 55, 294, 1925). Detailed directions for the laboratory preparation of alkyl aluminum halides by this method were subsequently given by Hnizda and Kraus (J. Amer. Chem. Soc., 60, 2276, 1938). It is seen that this method is very general, being capable theoretically of producing all alkyl aluminium halides. However, it is very expensive, requiring the use of alkyl halides.

A somewhat less general but very economical method for the preparation of alkyl aluminum halides has been described by Hall and Nash (J. Inst. Pet. Tech., 23, 679, 1937) involving contacting an olefine with a mixture of aluminum halide and metallic aluminum. I have found, as set forth in my patent previously mentioned, that this reaction proceeds much more rapidly and smoothly and higher yields of alkyl aluminum halides are obtained if the olefine is mixed with appreciable hydrogen prior to contacting with the aluminum halide-aluminum metal mixture or if activated metallic aluminum is employed. Especially good results are obtained if the olefine is mixed with hydrogen in appreciable amounts and activated metallic aluminum is employed. Obviously, it is impossible to prepare methyl aluminum halides by this general method but if aluminum chloride is used as the aluminum halide the process serves as a very economical source of alkyl aluminum chlorides higher than the methyl derivatives.

Alkyl aluminum halides may also be made by a variation of the above process involving passage of a hydrogen halide over metallic aluminum or preferably activated metallic aluminum following which an olefine, preferably in admixture with appreciable hydrogen, is passed over the resulting mixture to form the desired alkyl aluminum halides. Or, alkyl aluminum halides may be prepared by passing a mixture of a hydrogen halide and an olefine, said mixture preferably containing appreciable hydrogen, over metallic aluminum or activated metallic aluminum.

For the better understanding of this invention reference may be had to the following illustrative but non-limiting examples thereof.

*Example 1*

A mixture consisting essentially of normal butane and isobutane was brought to a temperature of 550° C. and passed over a catalyst consisting of 10% chromium oxide on activated alumina. About 20% of the charge was converted to olefines. The reaction products obtained by the catalytic dehydrogenation of the isobutane-normal butane mixture were subjected to a conventional absorption-stripping operation. Hydrocarbons of four carbon atoms were essentially completely absorbed in a hydrocarbon absorption oil and the resulting rich oil was stripped of these by fractionation under pressure. The resulting gas contained 60% isobutane, 21% normal butane, 14% isobutene and 5% normal butenes on a 100% $C_4$ basis. Unabsorbed components, consisting essentially of hydrogen and hydrocarbons of less than four carbon atoms to the molecule were compressed to a pressure of 1000 pounds per square inch, heated to 150° C. and passed over an intimate mixture of aluminum chloride and powdered activated metallic aluminum in equimolecular proportions. The resulting liquid product was divided into two portions. One portion was added to normal butane to catalyze the isomerization thereof and the mixture was held at 25° C. to 50° C. for a period of one week with occasional shaking. At the end of this period some 75% of the original normal butane had been isomerized to isobutane and the resulting mixture was employed as charge in the previously described catalytic dehydrogenation step. The second portion was added to the reaction products of four carbon atoms obtained from the catalytic dehydrogenation step by absorption-stripping to catalyze the alkylation of isobutane with isobutene and normal butenes. A yield of 183% isooctanes based on olefines was obtained.

As is evident, the small amount of gaseous olefinic byproducts obtained in the catalytic dehydrogenation of the reaction mixture obtained by the isomerization of normal butane is employed to product the catalyst required to isomerize the normal butane charge and to alkylate the isobutane formed by said isomerization with the butenes produced by catalytic dehydrogenation. For each 100 volumes of normal butane isomerized and dehydrogenated there were obtained about 15 volumes of hydrocarbons of less than four carbon atoms to the molecule and 100 volumes of hydrogen. The hydrocarbons of less than four carbon atoms to the molecule were about 50% olefines, mostly ethylene. On converting these lower olefines to alkyl aluminum halides there was formed sufficient catalyst to sustain both the isomerization and alkylation reactions. In converting these lower olefines to catalyst there is much more hydrogen present than is required for best results (actually, hydrogen is not essential) so most or all of the hydrogen may be discarded before making the catalyst. Preferably, however, for each volume of olefine at least 0.5 volume of hydrogen is retained. If it is inconvenient to discard part or all of the hydrogen it is not necessary to do so.

In the above example, isomerization was conducted under very mild conditions and a long time for reaction was required. If desired, higher operating temperatures may be employed but preferably not above about 200° C. Quite rapid isomerization is obtained in the temperature range 70–120° C. or even up to 150° C. Obviously, above 153° C. (the critical temperature of isobutane) vapor phase conditions prevail and this occurs even at lower temperatures such as have been mentioned unless superatmospheric pressure is employed.

The dehydrogenation of the isomerized product was also comparatively mild. For each 100 volumes of gas charged there were obtained about 60 volumes of isobutane, 21 volumes normal butane, 20 volumes hydrogen, 14 volumes isobutene, 5 volumes normal butenes and 3 volumes of hydrocarbons of less than four carbon atoms to the molecule. Such a gas mixture, especially after removal of hydrogen and, if desired, hydrocarbons of less than 4 carbon atoms to the molecule, is an excellent alkylation charge since the isobutane/olefine ratio is high which is every desirable in alkylation since olefine polymerization is thereby retarded. However, if desired, a portion, for example, one half, of the isomerized product may be dehydrogenated under more severe conditions than those described, for example, at a higher temperature and/or longer contact time and the products may, after hydrogen removal and, if desired, removal of hydrocarbons of less than four carbon atoms to the molecule, be mixed with the untreated isomerized mixture and the whole subjected to alkylation. When operating in this manner the dehydrogenation selectivity is somewhat impaired, i. e. the yield of hydrocarbons of less than four carbon atoms is somewhat higher than before.

Obviously, after alkylation, the unreacted hydrocarbons of four carbon atoms to the molecule are recycled in part or entirely. Preferably, the unreacted hydrocarbons are separated into isobutane and normal butane by accurate fractionation, the normal butane being recycled to the isomerization zone while the isobutane is recycled to the alkylation zone in part or entirely, sufficient being sent to the dehydrogenation zone to keep the unit in balance.

*Example 2*

A predominantly paraffinic heavy naphtha having a boiling range of 246–415° F. was mixed with 5 mole percent of ethyl aluminum dichloride and diethyl aluminum chloride in approximately equimoleculars proportions. The whole was heated to 400° F. and material boiling lower than the heavy naphtha charge was removed from the reaction mixture as formed and was separated into a gaseous component, largely isobutane, and a liquid component, isoparaffinic light naphtha. The gaseous component was catalytically dehydrogenated as described in Example 1 except that a catalyst consisting of 6% molybdenum oxide on activated alumina was employed. The dehydrogenated gaseous products were worked up as described in Example 1. The hydrogen and gaseous hydrocarbons containing less than four carbon atoms to the molecule obtained as byproducts from the catalytic dehydrogenation of the gaseous component were compressed to 1000 pounds per square inch, heated to 150° C. and passed over an intimate mixture of aluminum chloride and activated metallic aluminum in equimolecular proportions. The resulting liquid product, the essential ingredients of which comprised primarily ethyl aluminum dichloride and diethyl aluminum chloride, was divided into two portions. The resulting portions were distributed as indicated in Example 1, one was added to the fresh heavy naphtha charge to catalyze the destructive isomerization thereof and the other was added to the reaction products of four carbon atoms from the catalytic dehydrogenation step to catalyze the alkylation of isobutane with normal butenes and isobutene as previously described in Example 1. The blend of the resulting isooctane and the isoparaffinic light naphtha from destructive isomerization of heavy naphtha charge forms an excellent aviation fuel.

*Example 3*

Similar to Example 2. It has been found that in the destructive isomerization of heavy naphtha at elevated temperatures in the presence of alkyl aluminum halides the ratio of isobutane to isoparaffinic light naphtha formed can be widely varied at will by conducting the reaction in the presence of more or less hydrogen, especially hydrogen under pressure. As the amount of hydrogen is increased, isobutane production declines. Hydrogen from any convenient source may be employed, for example, hydrogen obtained as byproduct in the catalytic dehydrogenation of the gaseous component as previously described. If the hydrogen thus produced plus lower gaseous hydrocarbons is passed over aluminum halide-metallic aluminum (or activated metallic aluminum) mixture to produce alkyl aluminum halides as described in Examples 1 and 2 then the hydrogen remaining after this step may be employed to cut down isobutane production as described. As mentioned, the amount and pressure of hydrogen determines in large measure the isobutane-light isoparaffinic naphtha ratio in the products. If the treatment of heavy naphtha is carried out in the presence of 5 to 10 moles of hydrogen per mole of heavy naphtha at moderately elevated to high superatmospheric pressure, say 750 pounds per square inch or more, isobutane production is practically nil. On the other hand, if no hydrogen is used, about two moles of isobutane are produced per mole of isoparaffinic light naphtha at the temperature specific, the molecular weight of the isoparaffinic light naphtha being calculated as will be described below. Obviously, if a large amount of hydrogen is recycled it must be obtained from a source other than the products from the catalytic dehydrogenatic of isobutane since little or no isobutane forms. Usually however, hydrogen is employed to regulate, not prevent isobutane production.

*Example 4*

Similar to Example 2. It has been found that in the destructive isomerization of heavy naphtha at elevated temperatures in the presence of alkyl aluminum halides the ratio of isobutane to isoparaffinic light naphtha formed can be widely varied at will by conducting the reaction in the presence of more or less isobutane, especially isobutane under pressure. As the amount of isobutane added to the charge is increased, isobutane production from the charge decreases. Isobutane from any convenient source may be employed, for example, isobutane obtained from the heavy naphtha by destructive isomerization. As mentioned, the amount and pressure of isobutane added to the heavy naphtha charge determines in large measure the amount of isobutane made by the charge. If the treatment of heavy naphtha is carried out in the presence of 1 to 3 moles of isobutane per mole of heavy naphtha at moderately elevated to high superatmospheric pressure, say 750 pounds per square inch or more, isobutane production is practically nil. If on the other hand, no isobutane is added, about two moles of isobutane are produced per mole of isoparaffinic light naphtha produced at the temperature specified, the molecular weight of the isoparaffinic light naphtha being calculated as will be described below. Obviously, if a large amount of isobutane is recycled it must be obtained from a source other than the destructive isomerization of the heavy naphtha charge since under such conditions no isobutane forms. Usually, however, isobutane is recycled to regulate, not prevent, isobutane production.

Obviously, in Examples 3 and 4, isobutane production may be regulated or practically prevented by recycling a mixture of hydrogen and isobutane instead of either gas separately.

Heavy naphtha and light naphtha, being mixtures, have no true molecular weight but the approximate average molecular weights may be determined or may be calculated from empirical charts familiar to petroleum technologists. It is this average molecular weight that is used in the three previous examples.

The destructive isomerization of heavy naphtha described in the previous three examples may be conducted in the approximate temperature range 200–500° F., more or less.

While in the above examples the alkylation of isobutane with gaseous olefines has been described, the invention is not limited thereto. Any isoparaffin containing a tertiary hydrogen atom, that is a hydrogen atom attached to a carbon atom which in turn is attached to three other carbon atoms, may be employed.

Also, liquid olefines may be employed as the alkylating component. Among these may be mentioned, catalytic polymer gasoline, cracked gasolines, reformed naphthas and cracked wax distillates. Also, gaseous olefines from any convenient source may be employed as the alkylation component of the reaction mixture, for example, the gaseous olefines in refinery gases obtained from cracking, reforming and other operations.

As has been indicated previously, the catalyst for the isomerization and alkylation reactions may be prepared without the use of an aluminum halide by the interaction of an olefine, a hydrogen halide and metallic aluminum or activated metallic aluminum, preferably in the presence of hydrogen.

The necessary hydrogen halide may be obtained from known sources or it may be prepared by the union of part or all of the hydrogen formed in the catalytic dehydrogenation step with a halogen, for example, chlorine. For the olefine component, the hydrogen gases obtained in the catalytic dehydrogenation step that contain a lesser number of carbon atoms than the charge may be used. Obviously, olefines from other sources may be employed if desired.

The mixture containing the hydrogen halide and the olefine or the two separately may be compressed to say 20 to 200 atmospheres, preferably about 35 atmospheres and then passed through a reactor filled with metallic aluminum or activated metallic aluminum which may be in the form of powder (preferably formed into pellets), scrap, turnings, sheet, shot, foil or any other suitable form. Hydrogen is preferably added to the gaseous reactants. The operating temperature may be maintained in the range 50°–400° C., preferably 150°–350° C. The reaction is exothermic so cooling may be required under steady conditions, the exact amount of heating or cooling necessary depending upon the exact size and shape of the reactor, its insulation, etcetera.

Alternatively, the metallic aluminum or activated metallic aluminum may first be treated with the hydrogen halide to convert a part of the metal to aluminum halide following which the olefine containing component, preferably admixed with hydrogen, is passed over the resulting aluminum halide-metallic aluminum or activated metallic aluminum mixture. The reaction conditions are as previously described but, if desired, the interaction of hydrogen halide and metallic aluminum or activated metallic aluminum may be accomplished at low superatmospheric pressure or atmospheric pressure.

Obviously, in any scheme for the preparation of alkyl aluminum halides the metallic aluminum or activated metallic aluminum sooner or later becomes exhausted. If it is desired to produce catalyst continuously it is necessary to provide two or more reactors, at least one of which is always on stream while at least another is being repacked with the necessary reactant or reactants and is generally being made ready for putting on stream when the contents of the reactor or reactors on stream become exhausted. Obviously, in the alternate procedure for the production of catalyst involving first, the formation of the aluminum halide-metallic aluminum or activated metallic aluminum mixture followed by second, passing the olefine or olefine-hydrogen mixture, two reactors at least are required for continuous production of catalyst. However, as will be evident to those skilled in the art, continuous production of catalyst is not essential in the process of the instant invention.

It has been found that alkyl aluminum halides do not require activation with traces of water, hydrogen halides, alkyl halides and the like as is commonly required with aluminum halides. It is believed however that perhaps traces of water in the hydrocarbon charge may react with a small portion of the catalyst and thus bring about some degree of activation of the whole.

Be it remembered that while the instant invention has been described by means of certain specific examples thereof it is to be understood that these are illustrative only and the scope of said invention is to be in no way limited to the disclosures of such specific examples thereof.

I claim:

1. The hydrocarbon conversion process including subjecting a charge comprising an isoparaffin to catalytic dehydrogenation, separating the resulting reaction mixture into a first fraction comprising hydrocarbons of the same number of carbon atoms as the isoparaffin charge and a second fraction comprising hydrogen and hydrocarbons of a lesser number of carbon atoms than the isoparaffin charge, contacting said second fraction with a mixture of aluminum halide and metallic aluminum to form alkyl aluminum halides and adding catalytic amounts of said alkyl aluminum halides to said first fraction to accelerate the alkylation of unconverted isoparaffin charge by the olefines therein.

2. The process of claim 1, further characterized by the fact that said metallic aluminum is activated.

3. The process of claim 1, further characterized by the fact that said aluminum halide is aluminum chloride whereby alkyl aluminum chlorides are formed.

4. The process of claim 1, further characterized by the fact that said metallic aluminum is activated and said aluminum halide is aluminum chloride whereby alkyl aluminum chlorides are formed.

5. The hydrocarbon conversion process including subjecting a charge comprising an isoparaffin to catalytic dehydrogenation, separating the resulting mixture into a first fraction comprising hydrocarbons of the same number of carbon atoms as the isoparaffin charge and a second fraction comprising hydrogen and hydrocarbons of a lesser number of carbon atoms than the isoparaffin charge, contacting said second fraction with a mixture of aluminum halide and metallic aluminum to form alkyl aluminum halides, adding a first catalytic portion of said alkyl aluminum halides to said first fraction to accelerate the alkylation of unconverted isoparaffin charge by the olefines therein, adding a second catalytic portion of said alkyl aluminum halides to a charge comprising a normal paraffin containing at least four carbon atoms to accelerate the isomerization thereof to an isoparaffin and charging the resulting isomerizate to the catalytic dehydrogenation step.

6. The process of claim 5, further characterized by the fact that said metallic aluminum is activated.

7. The process of claim 5, further characterized by the fact that said aluminum halide is aluminum chloride whereby alkyl aluminum chlorides are formed.

8. The process of claim 5, further characterized by the fact that said metallic aluminum is activated and said aluminum halide is aluminum chloride whereby alkyl aluminum halides are formed.

9. The hydrocarbon conversion process including subjecting a charge comprising isobutane to catalytic dehydrogenation, separating the resulting reaction mixture into a first fraction comprising hydrocarbons of four carbon atoms and a second fraction comprising hydrogen and hydrocarbons of less than four carbon atoms, contacting said second fraction with a mixture of aluminum halide and metallic aluminum to form alkyl aluminum halides and adding catalytic amounts of said alkyl aluminum halides to said first fraction to accelerate the alkylation of unconverted isobutane by the olefines therein.

10. The process of claim 9, further characterized by the fact that said metallic aluminum is activated.

11. The process of claim 9, further characterized by the fact that said aluminum halide is aluminum chloride whereby alkyl aluminum chlorides are formed.

12. The process of claim 9, further characterized by the fact that said metallic aluminum is activated and said aluminum halide is aluminum chloride whereby alkyl aluminum chlorides are formed.

13. The hydrocarbon conversion process including subjecting a charge comprising isobutane to catalytic dehydrogenation, separating the resulting reaction mixture into a first fraction comprising hydrocarbons of four carbon atoms and a second fraction comprising hydrogen and hydrocarbons of less than four carbon atoms, contacting said second fraction with a mixture of aluminum halide and metallic aluminum to form alkyl aluminum halides, adding a first catalytic portion of said alkyl aluminum halides to said first fraction to accelerate the alkylation of unconverted isobutane by the olefines therein, adding a second catalytic portion of said alkyl aluminum halides to a charge comprising normal butane to accelerate the isomerization thereof to isobutane and charging the resulting isomerizate to the catalytic dehydrogenation zone.

14. The process of claim 13, further characterized by the fact that said metallic aluminum is activated.

15. The process of claim 13, further characterized by the fact that said aluminum halide is aluminum chloride whereby alkyl aluminum chlorides are formed.

16. The process of claim 13, further characterized by the fact that said metallic aluminum is activated and said aluminum halide is aluminum chloride whereby alkyl aluminum chlorides are formed.

17. The hydrocarbon conversion process including subjecting a charge comprising isobutane to catalytic dehydrogenation, separating the resulting reaction mixture into a first fraction comprising hydrocarbons of four carbon atoms and a second fraction comprising hydrogen and hydrocarbons containing less than four carbon atoms, contacting said second fraction with a mixture of aluminum halide and metallic aluminum to form alkyl aluminum halides, adding a first catalytic portion of said alkyl aluminum halides to said first fraction to accelerate the alkylation of unconverted isobutane by the olefines therein, adding a second catalytic portion of said alkyl aluminum halides to heavy naphtha to accelerate the conversion thereof to light isoparaffinic naphtha and isobutane and charging the resulting isobutane to the catalytic dehydrogenation step.

18. The process of claim 17, further characterized by the fact that said metallic aluminum is activated.

19. The process of claim 17, further characterized by the fact that said aluminum halide is aluminum chloride whereby alkyl aluminum chlorides are formed.

20. The process of claim 17, further characterized by the fact that said metallic aluminum is activated and said aluminum halide is aluminum chloride whereby alkyl aluminum chlorides are formed.

ROBERT F. RUTHRUFF.